(12) United States Patent
Kumru et al.

(10) Patent No.: US 7,807,740 B2
(45) Date of Patent: Oct. 5, 2010

(54) TWO-COMPONENT REACTION RESIN AND METHOD OF FASTENING USING THE RESIN

(75) Inventors: Emin Memet Kumru, Augsburg (DE); Thomas Buergel, Landsberg am Lech (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 503 days.

(21) Appl. No.: 12/004,380

(22) Filed: Dec. 19, 2007

(65) Prior Publication Data

US 2008/0171807 A1 Jul. 17, 2008

(30) Foreign Application Priority Data

Dec. 21, 2006 (DE) .................. 10 2006 060 732

(51) Int. Cl.
*C08K 5/13* (2006.01)
(52) U.S. Cl. .................. 524/323; 524/342; 524/343; 524/736
(58) Field of Classification Search .................. 524/323, 524/342, 343, 736
See application file for complete search history.

(56) References Cited

U.S. PATENT DOCUMENTS 4,381,386 A * 4/1983 Ritter et al. .................. 526/239

* cited by examiner

*Primary Examiner*—Edward J Cain
(74) *Attorney, Agent, or Firm*—Abelman, Frayne & Schwab

(57) ABSTRACT

A two-component reaction resin includes a resin component (A), which contains, as curable constituent (a), at least one free radical-curable, ethylenically unsaturated compound, an agent (b) for adjusting the reactivity and the gel time and at least one comonomer (c) and a curing component (B), which is disposed separate therefrom to inhibit any reaction and is a curing agent for the resin of the resin component (A) and which, as agent (b) for adjusting the reactivity and the gel time, contains a pyrocatechol derivative of the general Formula (I):

(I)

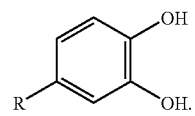

19 Claims, No Drawings

TWO-COMPONENT REACTION RESIN AND METHOD OF FASTENING USING THE RESIN

BACKGROUND OF THE INVENTION

1. Field of the Invention

The present invention relates to a two-component reaction resin with a resin component, which contains, as curable component, at least one free radical-curable, ethylenically unsaturated compound and one agent for adjusting the reactivity and the gel time, as well as, preferably, an accelerator for the curing agent, and a hardener component, which is disposed separated therefrom to inhibit reaction and contains a curing agent for the resin of the resin component. The present invention also relates to a method of chemically fastening threaded anchor rods, reinforcing steel, threaded sleeves and screws in boreholes, using the two-component reaction resin.

2. Description of the Prior Art

Two-component reaction resins, mainly preaccelerated methacrylate resins, that is, reaction resins, which contain an accelerator for the curing agent, require the addition of stabilizers, in order to avoid undesirable, premature polymerization during storage. Usually, the stabilizers are various compounds, which are added to the free radical-curable, ethylenically unsaturated compounds of the resin component in amounts of 20 ppm to 1000 ppm. Some of the stabilizers may also be used for adjusting the gel time, that is, for a selective delay in the start of the polymerization after the resin components, containing the accelerator, is mixed with the hardener component. However, for this purpose, the amounts of stabilizers must be increased clearly, depending on the gel time aimed for, up to 5000 ppm and more. Phenolic compounds, such as hydroquinone, p-methoxyphenol, 4-t-butylpyrocatechol, 2,6-di-t-butyl-4-methylphenol or 2,4-dimethyl-6-t-butylphenol are usually used as stabilizers of this type.

These phenolic compounds, especially those, which, because of their reactivity, are particularly suitable as an inhibitor of the premature polymerization of the reaction resins addressed, have the disadvantage that they are deactivated by oxygen from the air, especially in the presence of alkaline media, such as fillers like cement, which have an alkaline action and, during the storage of a correspondingly inhibited system, lead to a slow loss of the inhibiting activity. As a consequence, the gel time is reduced to unacceptably short periods, a process, referred to as gel time drift by those of ordinary skill in the art.

In order to prevent such a gel time drift, it is proposed in the DE 195 31 649 A1, which corresponds to U.S. Pat. No. 5,854,305 that the 4-t-butylpyrocatechol, which is actually outstandingly suitable, be replaced by an inhibitor producing a stable gel time, such as piperidinyl-N-oxyl or tetrahydropyrrole-N-oxyl. However, it has turned out that these inhibitors lead to a disproportionately strong inhibition of the polymerization reaction at low temperatures and reaction resins, containing these inhibitors, are subject to strong surface inhibition by the oxygen of the air, which leads to inadequate robustness of the curing.

Sterically hindered phenols, such as 2,6-di-t-butyl-4-methylphenol and 2,4-dimethyl-6-t-butylphenol admittedly are distinctly more stable with respect to the gel time and also lead to a suitable inhibition of the polymerization at room temperature. However, at low temperatures, the quality of the cured resin and, with that, the pull-out strength of a dowel, set with the help of such an inhibited reaction resin, is unsatisfactory. Furthermore, it may be noted that most of the compounds, used as stabilizers, or not at all suitable as inhibitors.

Further attempts to solve the problem of a gel time drift, such as the treatment of the reaction resin with insoluble, organic acids, amine salts, amine accelerators, titanium complex additives and stable free radical inhibitors have also not proven to be satisfactory. Accordingly, none of these aforementioned attempts to find a solution leads to a satisfactory gel time stability of the reaction resin, especially in the presence of cement or other substances, which react alkaline, as fillers.

Accordingly, an object of the present invention is to indicate inhibitors, which produce a stable gel time for the free radical polymerization of the two-component reaction resins given above, especially on the basis of methacrylate resins, which are filled, for instance, with cement or other fillers having an alkaline reaction, and which, on the one hand, ensure the stability of the gel time during storage of such reaction resins, as can be achieved, for example, with the inhibitors known from the U.S. Pat. No. 5,854,305 and, on the other, ensure the reactivity, robustness and quality of the curing even at the low temperatures, which are achievable with the 4-t-butylpyrocatechol inhibitor.

SUMMARY OF THE INVENTION

These and other objects of the present invention, which will become apparent hereinafter, are achieved by the use of certain pyrocatechol derivatives as agents for adjusting the reactivity and the gel time.

Surprisingly, it has been observed that, when the strongly activating t-butyl group of 4-t-butylpyrocatechol is replaced by less strongly activating groups, a sufficient inhibitor quality with a significantly lower gel time drift can be achieved and that, unexpectedly, the high performance level and the robustness of the inventive two-component reaction resin can also be achieved at low curing temperatures.

Thus, according to the invention, there is provided a two-component reaction resin with a resin component, which contains, as curable component, at least one free radical-curable, ethylenically unsaturated compound, an agent for adjusting the reactivity and the gel time and at least one comonomer and a hardener component, which is disposed separated therefrom to inhibit reaction and is a curing agent for the resin of the resin component, which is characterized in that the resin component, as agent for adjusting the reactivity and the gel time, contains a pyrocatechol derivative of the general Formula (I):

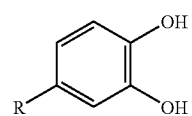

(I)

in which R represents a hydrogen atom, a methyl, ethyl, n-propyl, iso-propyl, n-butyl or iso-butyl group, which optionally is substituted by a hydroxy, alkoxy or alkylamino group, a group of the formula $R_1OOC—$, $R_1O—$, $R_1NH—$, or $R_1R_2N—$, in which $R_1$ and $R_2$ independently of one another represent hydroxy-substituted alkyl groups with 1 to 4 carbon atoms, an aldehyde group, a polyalkylene oxide group of Formula (II):

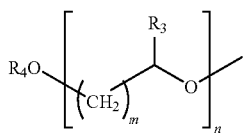

(II)

in which m is a whole number with a value from 1 to 3, n is a whole number with a value from 1 to 50, $R_3$ is a hydrogen atom or a methyl group and $R_4$ is a hydrogen atom, an alkyl group with 1 to 4 carbon atoms or a group of Formula (III)

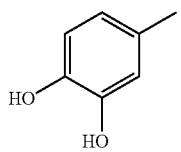

(III)

Preferably, as agent (b) for adjusting the reactivity and the gel time, the resin component (A) contains pyrocatechol, 3,4-dihydroxybenzaldehyde, 4-methyl-pyrocatechol and/or 4-methoxypyrocatechol.

The agent (b) for adjusting the reaction time and the gel time, which is also referred to in the following as inhibitor, is used preferably in an amount of 100 ppm to 2.0% by weight and preferably 500 ppm to 1.5% by weight and especially 1000 ppm to 1.0% by weight, based on the curable component (a) dissolved in the resin component (A).

In accordance with a preferred embodiment of the invention, the resin component (A) contains, as curable component (a), at least one vinyl ester of the Formula (A-CH=$CR_5$—CO—O)$_n$—R, a vinyl ether of the formula (A-CH=$CR_5$—O)$_n$—R, an allyl ester of the formula ($CH_2$=$CR_5$—$CH_2$—CO—O)$_n$—R, an allyl ether of the formula ($CH_2$=$CR_5$—$CH_2$—O)$_n$—R, a vinyl ester resin based on bisphenol A, a vinyl ester urethane resin or an oligomer or prepolymer of one or more of these monomers, in which A represent identical or different hydrogen atoms or alkyl groups with 1 to 3 carbon atoms, R is a linear or branched aliphatic group with 1 to 20 carbon atoms, which may also contain a cyclohexyl or a 1,4-dimethylenecyclohexyl group and one or more oxygen or sulfur atoms and be substituted with one or more functional groups, selected from hydroxy groups and amino groups, and one or two alkyl groups with 1 to 3 carbon atoms, an alkyl group or a vinyl group or R may represent a polyethylene glycol or polypropylene glycol group with an average chain length of 2 to 120 glycol units, which optionally has one aliphatic group with 1 to 5 carbon atoms, which is linked to the free hydroxyl group of the chain, $R_5$ represents hydrogen or an alkyl group with 1 to 8 carbon atoms and n represents 1, 2, 3 or 4.

Curable components (a), which are particularly preferred pursuant to the invention, are hydroxy butyl vinyl ether, diethylene glycol divinyl ether, triethylene glycol divinyl ether, 3-aminopropyl vinyl ether, t-amyl vinyl ether, butyl vinyl ether, cyclohexane dimethanol monovinyl ether, cyclohexyl vinyl ether, 3-diethylaminopropyl vinyl ether, diethylene glycol monovinyl ether, dodecyl vinyl ether, ethylene glycol butyl vinyl ether, ethylene glycol monovinyl ether, 2-ethylhexyl vinyl ether, ethyl vinyl ether, hexane diol monovinyl ether, hydroxybutyl vinyl ether, methyl vinyl ether, octadecyl vinyl ether, polyethylene glycol 520 methyl vinyl ether, triethylenglycol methyl vinyl ether, butane diol divinyl ether, cyclohexanedimethanol divinyl ether, diethylenglycol divinyl ether, dipropylene glycol divinyl ether, ethylene glycol divinyl ether, hexane diol divinyl ether, neopentyl glycol divinyl ether, tetraethylene glycol divinyl ether, triethylene glycol divinyl ether, trimethylolpropane trivinyl ether, tripropylene glycol divinyl ether, pentaerythritol tetravinyl ether, allyl ether, di(propylene glycol) allyl ether (meth)acrylate (mixture of isomers), diethylenglycol monoallyl ether, pentaerythritol allyl ether, trimethylolpropane allyl ether, trimethylolpropane diallyl ether, allyl benzyl ether, bisphenol-A-diallyl ether, allyl butyl ether, allyl ethyl ether, allyl glycidyl ether, allyl phenyl ether, allyl propyl ether, poly(epichlorohydrin-co-ethylene oxide-co-allyl glycidyl ether), ethylene glycol monoallyl ether, tetraethylene glycol diallyl ether, ethoxylated bisphenol A di(meth)acrylate with a degree of ethoxylation of 2 to 10 and preferably of 2 to 4, difunctional, trifunctional or higher functional urethane (meth)acrylate oligomers of these curable components.

Preferably, resin component (A) contains a methacrylate ester as comonomer (c). Pursuant to the invention, particularly preferred methacrylate esters are selected, as comonomers (c), from hydroxypropyl (meth)acrylate, butane diol 1,2-di(meth)acrylate, trimethylolpropane tri(meth)acrylate, 2-ethylhexyl (meth)acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, 1,4-butane diol di(meth)acrylate, acetoacetoxyethyl (meth)acrylate, 1,2-ethylene glycol di(meth)acrylate, isobornyl (meth)acrylate, diethylene glycol di(meth)acrylate, methoxy-polyethylene glycol mono (meth)acrylate, trimethylcycohexyl (meth)acrylate, 2-hydroxyethy (meth)acrylate, dicyclopentenyloxyethyl (meth)acrylate and/or tricyclopentadienyl di(meth)acrylate, bisphenol-A (meth)acrylate, novolak epoxidi(meth)acrylate, di-[(meth)acryloyl maleoyl)-tricyclo-5.2.1.0.$^{2.6}$-decane, dicyclopentenyloxyethyl crotonate, 3-(meth)-acryloyl hydroxymethyl-tricylo-5.2.1.0.$^{2.6}$-decane, 3-(meth)-yclopenta-dienyl (meth)acrylate, isobornyl (meth)acrylate and decalyl 2-(meth)acrylate.

The nomenclature " . . . (meth)acryl . . . , used for naming the curable components (a) and the comonomers (c), means that the " . . . methacryl . . . " and the " . . . acryl . . . " are included by this name.

In accordance with a particular preferred embodiment of the invention, the resin component is present in the pre-accelerated form. This means that it contains an accelerator for the curing agent, because, especially for this preferred embodiment of the invention, the agent for adjusting the reactivity and the gel time of the reaction resin has proven to be particularly effective. Preferred accelerators for the curing agent are aromatic amines and/or salts of cobalt, manganese, tin, vanadium or cerium. As accelerators, N,N-dimethylaniline, N,N-diethylaniline, N,N-diisopropanol p-toluidine, N,N-diisopropylidene p-toluidine, N,N-Dimethyl p-toluidine, N,N-diethylol p-toluidine, N,N-diisopropyl m-toluidine, N,N-bis(2-hydroxyethyl) toluidine, N,N-bis(2-hydroxyethyl) xylidine, N-methyl-N-hydroxyethyl p-toluidine, cobalt octoate, cobalt naphthenate, vanadium(IV) acetylacetonate and vanadium(V) acetylacetonate have proven to be particularly advantageous.

In accordance with a further preferred embodiment of the invention, the resin component and/or the hardener component contain at least one inorganic filler, such as, preferably, quartz, glass, corundum, porcelain, stone ware, light spar, heavy spar, gypsum, talcum, chalk or mixtures thereof, these fillers being contained in the form of sands, flours or molded objects, especially in the form of fibers or spheres.

The hardener component of the inventive two-component reactive resin contains, as curing aging, at least one organic peroxide, preferably dibenzoyl peroxide, methyl ethyl ketone peroxide, t-butyl perbenzoate, cyclohexanone peroxide, lauryl peroxide, cumene hydroperoxide and/or t-butyl peroxy-2-ethyl hexanoate.

Pursuant to the invention, two-component reaction resins, which, in addition to the resin, also contain an inorganic compound, which can set or polycondense hydraulically, in the resin component and, in addition to the curing agent, also contain water in the hardener component, are preferred.

Moreover, as inorganic compound, which can set or polycondense hydraulically, the resin component preferably contains cement, for example, Portland cement or aluminate cement, cements which contain little or no iron oxide being particularly preferred. Gypsum, as such or in a mixture with the cement, can also be used as hydraulically setting inorganic compound.

As polycondensible, inorganic compound, the resin component also comprise polycondensible silicate compounds, especially materials containing soluble, dissolved and/or amorphous silica.

A further object of the invention is a cartridge, a container or a film bag, which contains a two-component reaction resin of the type described above and comprises two or more chambers, which are separated from one another and in which the resin component and the hardener component are contained separated from one another to inhibit any reaction. When the inventive two-component reaction resin is used as intended, the resin component and the hardener component are expressed under the action of mechanical forces or by gas pressure from the cartridges, containers or film bags, mixed with one another, preferably with the help of a static mixer, through which the components are passed, and introduced into the borehole, after which the devices to be fastened, such as threaded anchor rods, etc. are inserted into the borehole charged with curing reaction resin and adjusted appropriately.

A further object of the invention therefore is the use of the two-component reaction resin described above for fastening threaded anchor rods, reinforcing iron, threaded sleeves and screws in boreholes of any substrate.

The novel features of the present invention, which are considered as characteristic for the invention, are set forth in the appended claims. The invention itself and its mode of operation, together with additional advantages and objects thereof, will be best understood from the following detailed description of preferred embodiments.

DETAILED DESCRIPTION OF THE PREFERRED EMBODIMENTS

The preferred embodiments of the invention will be described below by way of examples.

EXAMPLE 1

Two-Component Reaction Resin on the Basis of a Urethane Methacrylate (UMA)

To begin with, the A component of a two-component reaction resin is prepared by homogenizing 42.0 g of the resin component (A), given in the following Table 1, with 20.0 g of cement, 36.0 g of quartz sand with an average particle size of 0.4 mm and 2.0 g of hydrophobic, pyrogenic silica in a dissolver under vacuum into an air bubble-free pasty composition. This composition is transferred into a cartridge.

As component B of the two-component reaction resin, that is, as hardener component (B), a conventional commercial B component is used. It consists of an aqueous benzoyl peroxide suspension, finely ground quartz and pyrogenic silica, has a total degree of filling of 60% by weight and a peroxide content of 7.5% by weight and is also transferred into a cartridge.

For the use as intended, the A component and the B component are expressed from the cartridges and pass through a static mixture. As a result, the reaction of these components sets in with curing of the reaction resin. The reacting composition is injected into the borehole, whereupon the part, which is to be fastened, is introduced and adjusted.

The gel time of the mixture, obtained in this way from the A and B components of the two-component reaction resin, is determined with a conventional commercial device (gel timer) at a temperature of 25° C. For this purpose, the A and B components are brought in a 3:1 ratio by volume into a test tube up to about 4 cm below the rim, the tests tube being maintained at a temperature of 25° C. (DIN 16945, DIN EIN ISO 9396). A glass rod or a spindle is moved up and down in the resin with 10 lifts per minute. The gel time is the time at which the test tube is lifted by the oscillating rod. Random tests showed that the degree of curing at the gel point (measured by means of differential scanning calorimetry (DSC)) is constant within the accuracy of the measurement.

For determining the load values of the cured composition, a threaded M12 anchor rod is used, which is doweled with the inventive two-component reaction resin into a borehole with a diameter of 14 mm and a depth of 72 mm. The average failure load is determined by pulling out the threaded anchor rod centrally with a tight support using high-strength threaded anchors. In each case, 5 threaded anchor rods are doweled in and their load values are determined after 24 hours of curing. The load values, so obtained, are also listed as average values in the following Table 1.

TABLE 1

| Resin Component (A) | Comparison UMA-REF 4-T-Butyl pyrocatechol | Inventive UMA-1 4-Methyl pyrocatechol | Inventive UMA-2 4-Methyl Pyrocatechol |
|---|---|---|---|
| Urethane methacrylate oligomer, difunctional [g] | 36.90 | 36.90 | 36.90 |
| Hydroxypropyl methacrylate [g] | 25.70 | 25.70 | 25.70 |
| Butane diol 1,4-dimethacrylate [g] | 26.50 | 26.50 | 26.50 |
| Trimethylolpropane trimethacrylate [g] | 7.95 | 7.95 | 7.95 |
| p-Toluidine (accelerator) [g] | 2.31 | 2.31 | 2.31 |
| Agent (b) inhibitor [g] | 0.37 | 0.31 | 0.33 |
| Stabilizer[1] [g] | 0.03 | 0.03 | 0.03 |
| Gel time [@ 25° C.] | 06:10 | 05:26 | 05:01 |
| After 28 d at 40° C. (% of starting value | 62 | 79 | 89 |
| After 56 d at 40° C. (% of starting value | 51 | 67 | 88 |
| Load values [kN] | | | |
| Reference | 62.0 | 69.8 | 66.8 |
| −10° C. | 57.3 | 62.5 | 61.4 |
| +40° C. | 41.2 | 51.9 | 59.2 |
| F1b | 44.3 | 48.3 | 48.4 |

[1] piperidinyl-N-oxyl

The abbreviations, given in the above Table for the load values, have the following meanings:

| | |
|---|---|
| Reference: | Dry, cleaned borehole, threaded anchor rod set and resin cured at room temperature |
| −10° C. | Like reference, however, the threaded anchor rod set and resin cured at −10° C. |
| =40° C. | Like reference, however, the threaded anchor rod set and the resin cured at −40° C. |
| F1B | Semi-cleaned and moist borehole, threaded anchor rod set and cured at room temperature. |

The above Table shows that the inventive two-component reaction resin has a significantly lower gel time drift and appreciably better load values at low as well as at high temperatures and also in the case of semi-cleaned and moist boreholes and this in the presence of alkaline-reacting aluminate cement.

EXAMPLE 2

Two-Component Reaction Resin Based on an Ethoxylated Bisphenol A Dimethacrylate (EBD)

The two-component reaction resin is prepared as described in Example 1, starting from the constituents of the resin component (A), given in the following Table 2.

The reaction resin is cured and the load values are determined also in the manner described in Example 1a the results obtained here are given in the following Table 2.

TABLE 2

| Resin Component (A) | Comparison EBD-REF 4-t-butyl pyrocatechol | Inventive EBD -1 4-Methyl pyrocatechol | Inventive EBD -2 Pyrocatechol |
|---|---|---|---|
| EBD (degree of ethoxylation = 2 [g] | 47.5 | 47.5 | 47.5 |
| EBD (degree of ethoxylation = 4 [g] | 20 | 20 | 20 |
| Hydroxypropyl methacrylate [g] | 15 | 15 | 15 |
| Butane diol 1,4-dimethacylate [g] | 15 | 15 | 15 |
| p-Toluidine (accelerator) [g] | 2.3 | 2.3 | 2.3 |
| Agent (b) inhibitor [g] | 0.27 | 0.25 | 0.26 |
| Stabilizer[1] [g] | 0.03 | 0.03 | 0.03 |
| Gel time [@ 25° C.] | 06:23 | 06:36 | 05:40 |
| After 28 d at 40° C. (% of starting value | 69 | 82 | 87 |
| After 56 d at 40° C. (% of starting value | 58 | 70 | 80 |
| Load values [kN] | | | |
| Reference | 61.4 | 69.1 | 68.6 |
| −10° C. | 59.2 | 67.6 | 62.4 |
| +40° C. | 42.2 | 53.2 | 56.2 |
| F1b | 42.3 | 43.4 | 43.3 |

[1]peridinyl-N-oxyl

This example also confirms the surprising fact that the inventive two-component reaction resins have a clearly improved stability of the gel time and, relative to the comparison resin, at least an equivalent and, in some cases, even an improved performance when used as a dowel composition for chemically fastening threaded anchor rods.

Though the present invention was shown and described with references to the preferred embodiments, such are merely illustrative of the present invention and is not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A two-component reaction resin with a resin component (A), which contains, as curable component (a), at least one free radical-curable, ethylenically unsaturated compound, an agent (b) for adjusting the reactivity and the gel time and at least one comonomer (c), and a hardener component (B), which is disposed separated therefrom to inhibit reaction and is a curing agent for the resin of the resin component (A), which is characterized in that the resin component (A), as agent (b) for adjusting the reactivity and the gel time, contains a pyrocatechol derivative of the general Formula (I):

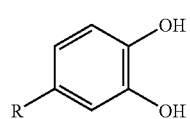

(I)

in which R represents a hydrogen atom, a methyl, ethyl, n-propyl, iso-propyl, n-butyl or iso-butyl group, which optionally is substituted by a hydroxy, alkoxy or alkylamino group, a group of the formula $R_1OOC—$, $R_1O—$, $R_1NH—$, or $R_1R_2N—$, in which $R_1$ and $R_2$ independently of one another represent hydroxy-substituted alkyl groups with 1 to 4 carbon atoms, an aldehyde group, a polyalkylene oxide group of Formula (II):

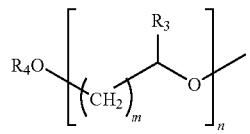

(II)

in which m is a whole number with a value from 1 to 3, n is a whole number with a value from 1 to 50, $R_3$ is a hydrogen atom or a methyl group and $R_4$ is a hydrogen atom, an alkyl group with 1 to 4 carbon atoms or a group of Formula (III)

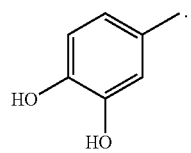

(III)

2. The reaction resin of claim 1, characterized in that the resin component (A) contains pyrocatechol, 3,4-dihydroxy-benzaldehyde, 4-methyl-pyrocatechol and/or 4-methoxypyrocatechol as agent (b) for adjusting the reactivity and the gel time.

3. The reaction resin of claim 1, characterized in that the agent (b) for adjusting the reactivity and the gel time is contained in an amount of 100 ppm to 2.0% by weight and preferably 500 ppm to 1.5% by weight and especially 1000 ppm to 1.0% by weight, based on the curable component (a) dissolved in the resin component (A), 4. The reaction resin of claim 1, characterized in that the resin component (A) contains, as curable component (a) at least one vinyl ester of the Formula $(A\text{-}CH=CR_5\text{-}CO\text{-}O)_n\text{-}R$, a vinyl ether of the formula $(A\text{-}CH=CR_5\text{-}O)_nR$, an allyl ester of the formula $(CH_2=CR_5\text{-}CH_2\text{-}CO\text{-}O)_n\text{-}R$, an allyl ether of the formula $(CH_2=CR_5\text{-}CH_2\text{-}O)_n\text{-}R$, a vinyl ester resin based on bisphenol A, a vinyl ester urethane resin or an oligomer or prepolymer of one or more of these monomers, in which A represent identical or different hydrogen atoms or alkyl groups with 1 to 3 carbon atoms, R is a linear or branched aliphatic group with 1 to 20 carbon atoms, which may also contain a cyclohexyl or a 1,4-dimethylenecyclohexyl group and one or more oxygen or sulfur atoms and be substituted with one or more functional groups, selected from hydroxy groups and amino groups, and one or two alkyl groups with 1 to 3 carbon atoms, an alkyl group or a vinyl group or R may represent a polyethylene glycol or polypropylene glycol group with an average chain length of 2 to 120 glycol units, which optionally has one aliphatic group with 1 to 5 carbon atoms, which is linked to the free hydroxyl group of the chain, $R_5$ represents hydrogen or an alkyl group with 1 to 8 carbon atoms and n represents 1, 2, 3 or 4.

5. The reaction resin of claim 4, characterized in that, as curable component (a), the resin component (A) contains hydroxy butyl vinyl ether, diethylene glycol divinyl ether, triethylene glycol divinyl ether, 3-aminopropyl vinyl ether, t-amyl vinyl ether, butyl vinyl ether, cyclohexane dimethanol monovinyl ether, cyclohexyl vinyl ether, 3-diethylaminopropyl vinyl ether, diethylene glycol monovinyl ether, dodecyl vinyl ether, ethylene glycol butyl vinyl ether, ethylene glycol monovinyl ether, 2-ethylhexyl vinyl ether, ethyl vinyl ether, hexane diol monovinyl ether, hydroxybutyl vinyl ether, methyl vinyl ether, octadecyl vinyl ether, polyethylene glycol 520 methyl vinyl ether, triethylenglycol methyl vinyl ether, butane diol divinyl ether, cyclohexanedimethanol divinyl ether, diethylenglycol divinyl ether, dipropylene glycol divinyl ether, ethylene glycol divinyl ether, hexane diol divinyl ether, neopentyl glycol divinyl ether, tetraethylene glycol divinyl ether, triethylene glycol divinyl ether, trimethylolpropane trivinyl ether, tripropylene glycol divinyl ether, pentaerythritol tetravinyl ether, allyl ether, di(propylene glycol) allyl ether (meth)acrylate (mixture of isomers), diethylenglycol monoallyl ether, pentaerythritol allyl ether, trimethylolpropane allyl ether, trimethylolpropane diallyl ether, allyl benzyl ether, bisphenol-A-diallyl ether, allyl butyl ether, allyl ethyl ether, allyl glycidyl ether, allyl phenyl ether, allyl propyl ether, poly(epichlorohydrin-co-ethylene oxide-co-allyl glycidyl ether), ethylene glycol monoallyl ether, tetraethylene glycol diallyl ether, ethoxylated bisphenol A di(meth)acrylate with a degree of ethoxylation of 2 to 10 and preferably of 2 to 4, and/or difunctional, trifunctional or higher functional urethane (meth)acrylate oligomers.

6. The reaction resin of claim 1, characterized in that, as comonomer (c), the resin component (A) contains a (meth)acrylate ester.

7. The reaction resin of claim 6, characterized in that, as comonomer (c), the resin component (A) contains hydroxypropyl (meth)acrylate, butane diol 1,2-di(meth)acrylate, trimethylolpropane tri(meth)acrylate, 2-ethylhexyl (meth)acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, 1,4-butane diol di(meth)acrylate, acetoacetoxyethyl (meth)acrylate, 1,2-ethylene glycol di(meth)acrylate, isobornyl (meth)acrylate, diethylene glycol di(meth)acrylate, methoxy-polyethylene glycol mono(meth)acrylate, trimethylcycohexyl (meth)acrylate, 2-hydroxyethy (meth)acrylate, dicyclopentenyloxyethyl (meth)acrylate and/or tricyclopentadienyl di(meth)acrylate, bisphenol-A (meth)acrylate, novolak epoxidi(meth)acrylate, di-[(meth)acryloyl maleoyl)-tricyclo-5.2.1.0.$^{2.6}$-decane, dicyclopentenyloxyethyl crotonate, 3-(meth)acryloyl hydroxymethyl-tricylo-5.2.1.0.$^{2.6}$-decane, 3-(meth)-yclopenta-dienyl (meth)acrylate, isobornyl (meth)acrylate and/or decalyl 2-(meth)acrylate.

8. The reaction resin of claim 1, characterized in that the resin component (A) contains an accelerator (d) for the curing agent.

9. The reaction resin of claim 8, characterized in that, as accelerator (d), the resin component (A) contains an aromatic amine and/or a salt of cobalt, manganese, tin, vanadium or cerium.

10. The reaction resin of claim 9, characterized in that, as accelerator (d), the resin component (A) contains N,N-dimethylaniline, N,N-diethylaniline, N,N-diisopropanol p-toluidine, N,N-diisopropylidene p-toluidine, N,N-Dimethyl p-toluidine, N,N-diethylol p-toluidine, N,N-diisopropyl m-toluidine, N,N-bis(2-hydroxyethyl) toluidine, N,N-bis(2-hydroxyethyl) xylidine, N-methyl-N-hydroxyethyl p-toluidine, cobalt octoate, cobalt naphthenate, vanadium(IV) acetylacetonate and/or vanadium(V) acetylacetonate.

11. The reaction resin of claim 1, characterized in that it contains at least one inorganic filler in the resin component (A) and/or the hardener component (B).

12. The reaction resin of claim 11, characterized in that, as inorganic filler, quartz, glass, corundum, porcelain, stone ware, heavy spar, light spar, gypsum, talcum, chalk or mixtures thereof, these fillers being contained in the form of sands, flours or molded objects are contained, especially in the form of fibers or spheres.

13. The reaction resin of claim 1, characterized in that, as curing agent, the hardener component (B) contains at least one organic peroxide, preferably dibenzoyl peroxide, methyl ethyl ketone peroxide, t-butyl perbenzoate, cyclohexanone peroxide, lauryl peroxide, cumene hydroperoxide and/or t-butyl peroxy-2-ethyl hexanoate.

14. The reaction resin of claim 1, characterized in that, aside from the resin, the resin component (A) contains in addition, an inorganic compound, which can set or polycondensed hydraulically and, aside from the curing agent, the hardener component (B) also contains water.

15. The reaction resin of claim 14, characterized in that, as inorganic compound, which can set or polycondensed hydraulically, the resin component (A) contains cement, preferably aluminate cement, and/or gypsum.

16. The reaction resin of claim 15, characterized in that, as cement, the resin component (A) contains cements, which contain little or no iron oxide.

17. The reaction resin of claim 16, characterized in that, as polycondensible compound, the resin component (A) contains polycondensible silicate compounds, especially soluble, dissolved and/or amorphous materials containing silica.

18. A container, comprising at least two chambers, which are separated from one another and in which a free radical-curable reaction resin with resin component (A) which contains, as curable component (a), at least one free radical-curable, ethylenically unsaturated compound, an agent (b) for adjusting the reactivity and the gel time and at least one comonomer (c), characterized in that the resin component (A), as agent (b) for adjusting the reactivity and the gel time, contains a pyrocatechol derivative of the general Formula (I):

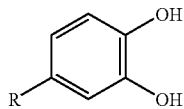
(I)

in which R represents a hydrogen atom, a methyl, ethyl, n-propyl, iso-propyl, n-butyl or iso-butyl group, which optionally is substituted by a hydroxy, alkoxy or alkylamino group, a group of the formula $R_1OOC-$, $R_1O-$, $R_1NH-$, or $R_1R_2N-$, in which $R_1$ and $R_2$ independently of one another represent hydroxy-substituted alkyl groups with 1 to 4 carbon atoms, an aldehyde group, a polyalkylene oxide group of Formula (II):

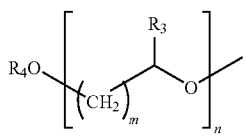
(II)

in which m is a whole number with a value from 1 to 3, n is a whole number with a value from 1 to 50, $R_3$ is a hydrogen atom or a methyl group and $R_4$ is a hydrogen atom, an alkyl group with 1 to 4 carbon atoms or a group of Formula (III)

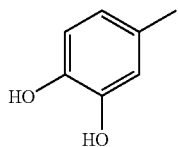
(III)

and the curing agent in form of a hardener component (B) are disposed, respectively.

19. A method of chemically fastening threaded anchor rods, reinforcing steel, threaded sleeves and screws in boreholes, comprising the steps of providing a two-component reaction resin with a resin component (A) which contains, as curable component (a), at least one free radical-curable, ethylenically unsaturated compound, an agent (b) for adjusting the reactivity and the gel time and at least one comonomer (c), and a hardener component (B), which is disposed separated therefrom to inhibit reaction and is a curing agent for the resin of the resin component (A), which is characterized in that the resin component (A), as agent (b) for adjusting the reactivity and the gel time, contains a pyrocatechol derivative of the general Formula (I):

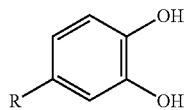
(I)

in which R represents a hydrogen atom, a methyl, ethyl, n-propyl, iso-propyl, n-butyl or iso-butyl group, which optionally is substituted by a hydroxy, alkoxy or alkylamino group, a group of the formula $R_1OOC-$, $R_1O-$, $R_1NH-$, or $R_1R_2N-$, in which $R_1$ and $R_2$ independently of one another represent hydroxy-substituted alkyl groups with 1 to 4 carbon atoms, an aldehyde group, a polyalkylene oxide group of Formula (II):

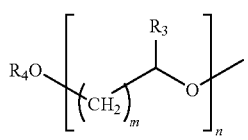
(II)

in which m is a whole number with a value from 1 to 3, n is a whole number with a value from 1 to 50, $R_3$ is a hydrogen atom or a methyl group and $R_4$ is a hydrogen atom, an alkyl group with 1 to 4 carbon atoms or a group of Formula (III)

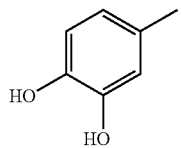
(III)

filling a borehole with the reaction resin; and inserting one of threaded anchor rod, reinforcing steel, threaded sleeve and screw in the borehole.

* * * * *